Figure 1:
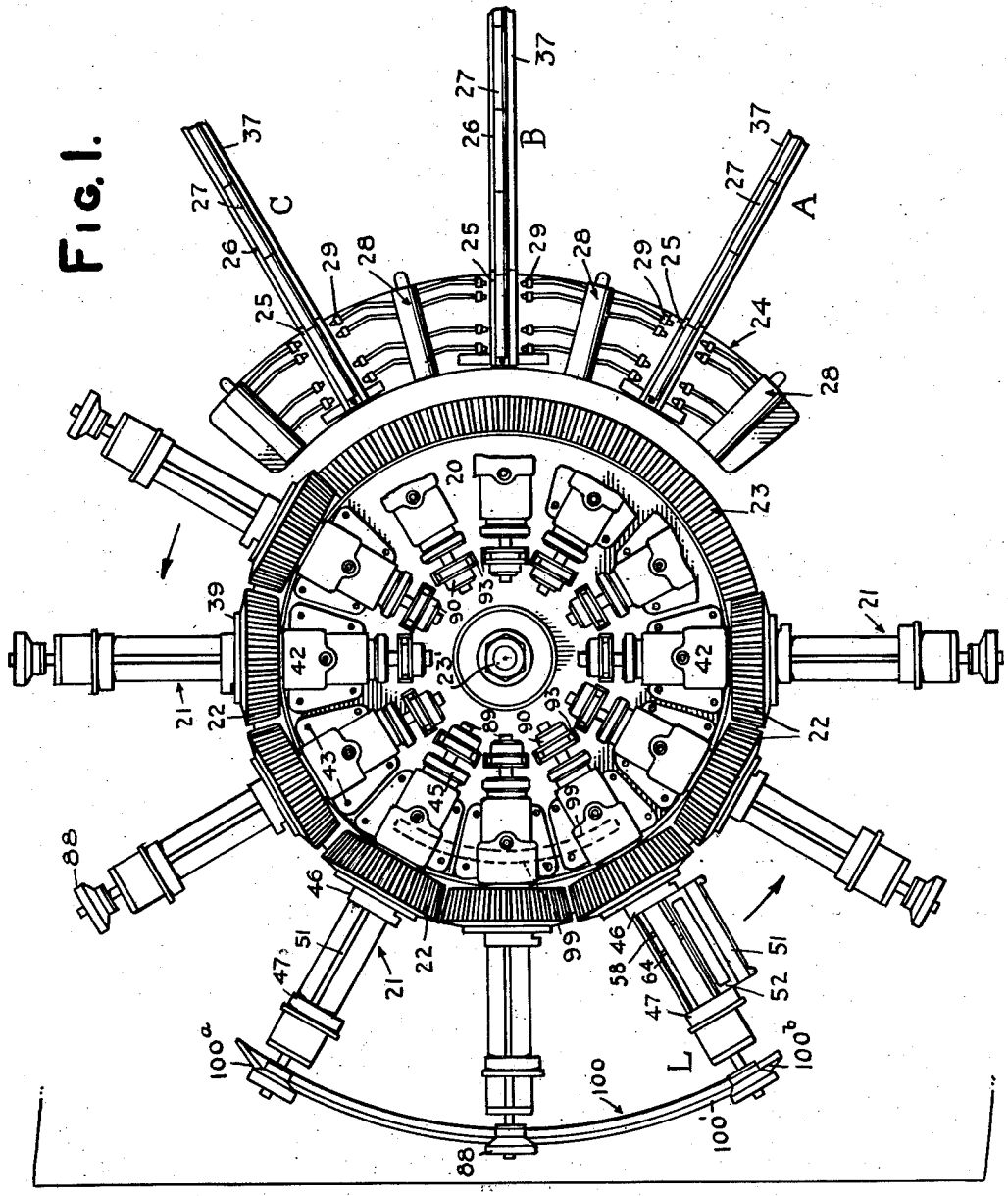

May 10, 1955  A. F. PITYO  2,707,848
APPARATUS FOR ATTACHING GLASS ELEMENTS TO METAL PARTS
Filed Nov. 27, 1950  4 Sheets-Sheet 1

INVENTOR.
ALBERT F. PITYO
BY
ATTORNEY

May 10, 1955 A. F. PITYO 2,707,848
APPARATUS FOR ATTACHING GLASS ELEMENTS TO METAL PARTS
Filed Nov. 27, 1950 4 Sheets-Sheet 2
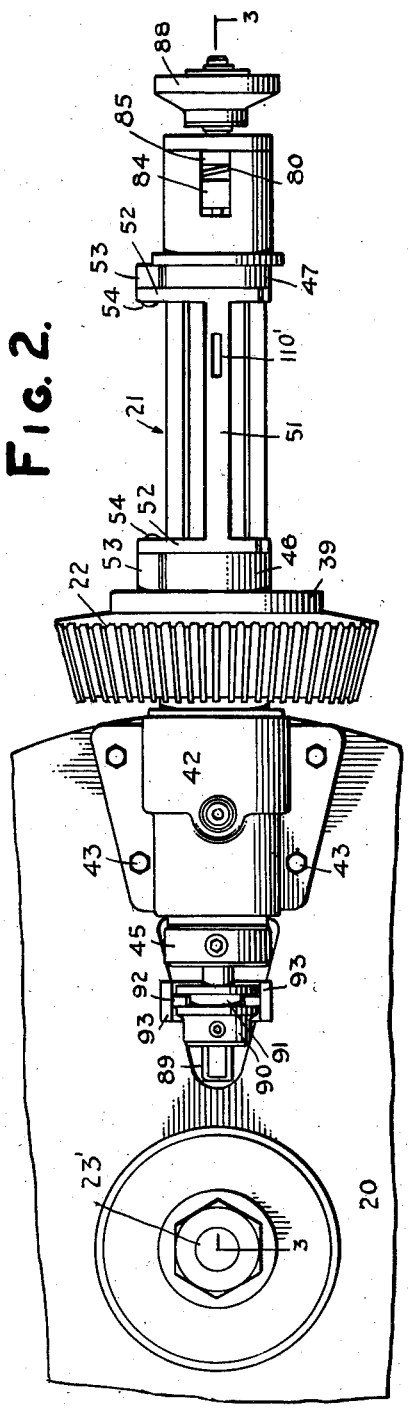
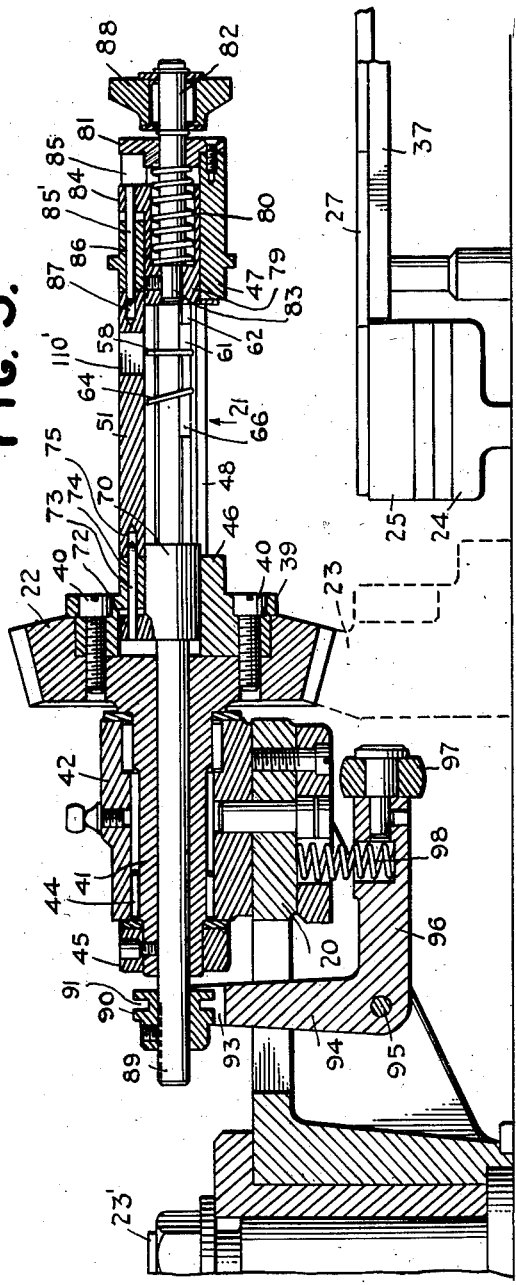
INVENTOR.
ALBERT F. PITYO
BY
ATTORNEY

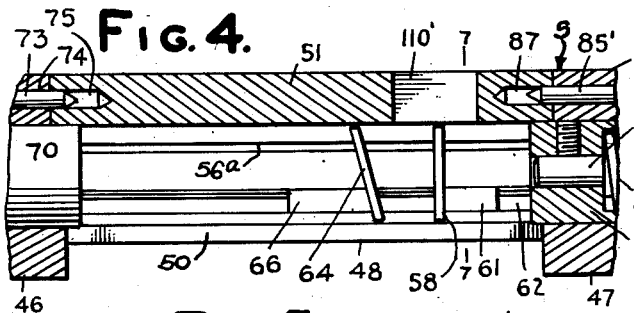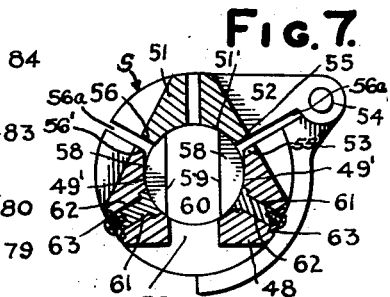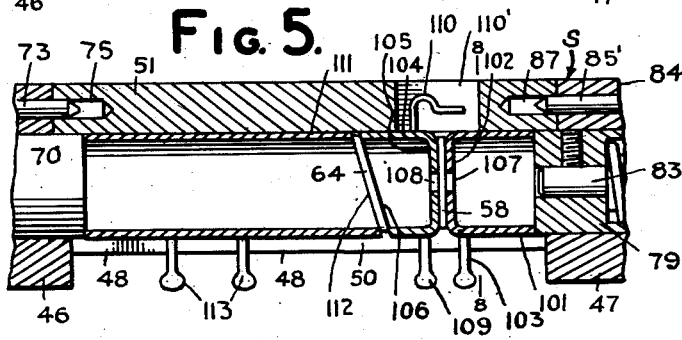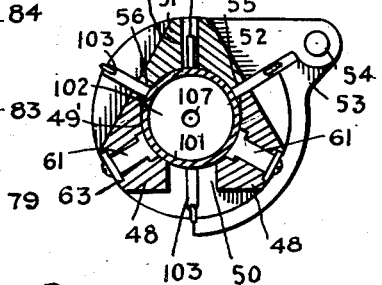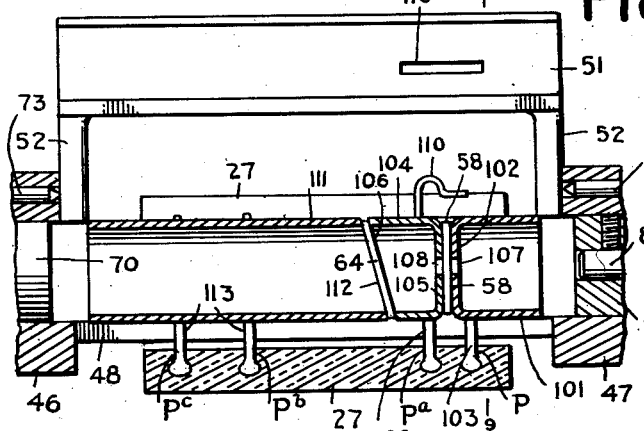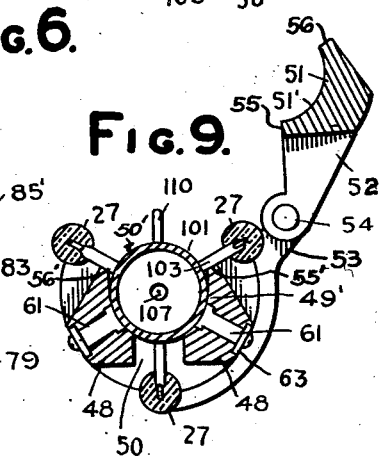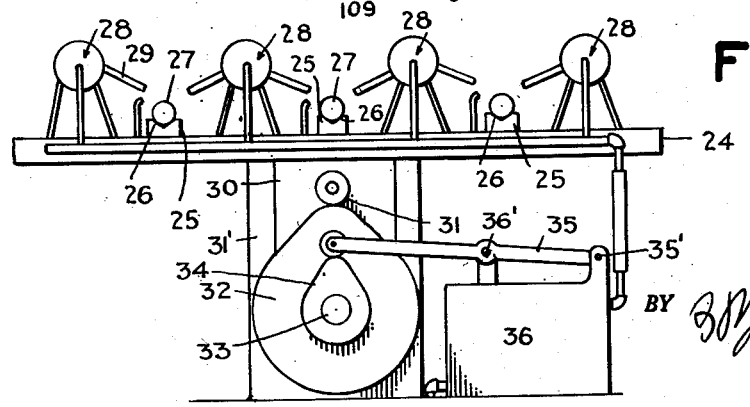

May 10, 1955 A. F. PITYO 2,707,848
APPARATUS FOR ATTACHING GLASS ELEMENTS TO METAL PARTS
Filed Nov. 27, 1950 4 Sheets-Sheet 4
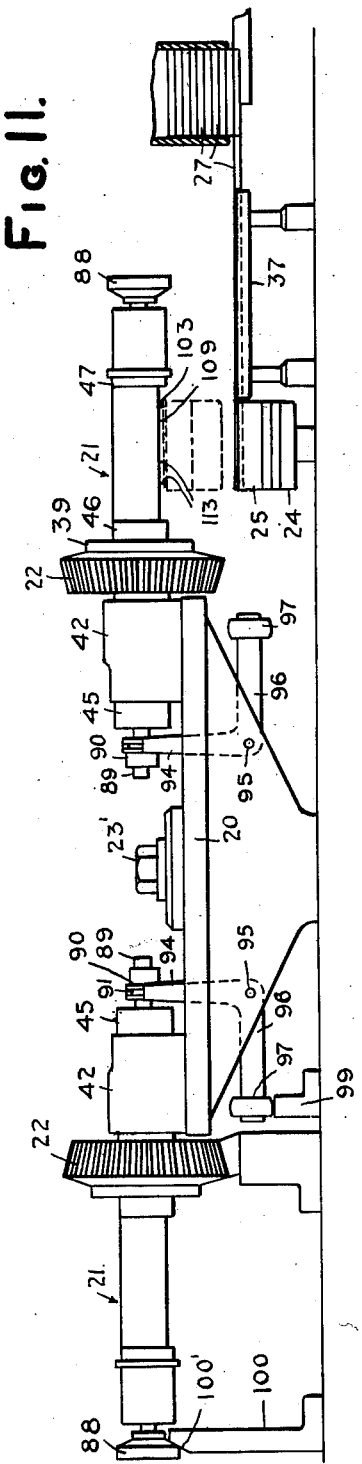
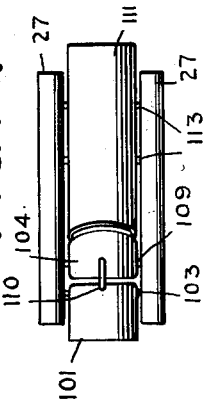
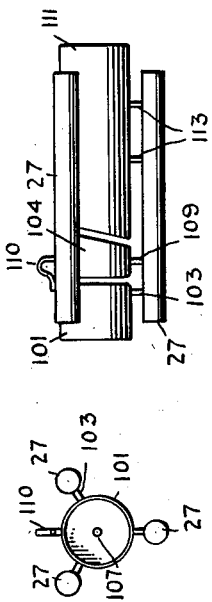
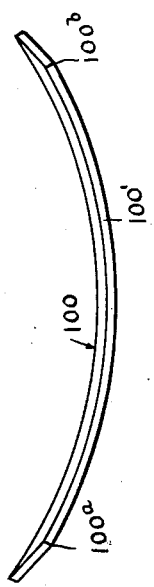
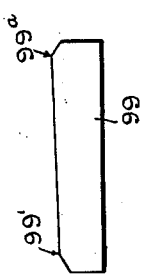
INVENTOR.
ALBERT F. PITYO
BY
ATTORNEY

United States Patent Office 2,707,848
Patented May 10, 1955

2,707,848

APPARATUS FOR ATTACHING GLASS ELEMENTS TO METAL PARTS

Albert F. Pityo, Clifton, N. J.

Application November 27, 1950, Serial No. 197,780

24 Claims. (Cl. 49—1)

My invention relates to apparatus for attaching glass elements to metal parts.

An important object of the invention is to provide apparatus of the above-mentioned character whereby glass rods may be anchored to metal pins secured to gun components of cathode ray tubes.

A further object of the invention is to provide an apparatus which will hold the radial pins in the set or sets, to cause the pins to be in proper alignment, at the time that the glass rod or rods are secured to the pins.

A further object of the invention is to provide apparatus having a cover for the holder, which cover will engage with the metal pins when the cover is closed, so that the pins in the set will be in proper alignment, prior to securing a glass rod to the pins.

A further object of the invention is to provide means for accurately longitudinally spacing the metallic tubes of the gun component parts, within the holder, and will permit the proper removal of the finished product.

A further object of the invention is to provide means for indexing the holder to several positions, for loading, attaching the last rods to the pins and then removing the finished product.

A further object of the invention is to provide means to heat the glass rod at points to plasticise the same and then move the rods toward the pins so that the pins are embedded in the plasticised portions.

A further object of the invention is to provide automatic means to lock the cover of the holder in the closed position.

A further object of the invention is to provide means to turn each holder upon its longitudinal axis so that the next set of pins is brought into position to be secured to the glass rod.

Other objects and advantages of the invention will be apparent during the course of the following description.

In the accompanying drawings forming a part of this application and in which like numerals are employed to designate like parts throughout same, Figure 1 is a plan view of apparatus embodying my invention, parts broken away for the purpose of illustration, Figure 2 is an enlarged plan view of one of the holders and associated elements, Figure 3 is a longitudinal vertical section taken on line 3—3 of Figure 2, Figure 4 is a central vertical longitudinal section through the holder, upon a further enlarged scale, parts broken away, and the holder being empty, and the cover closed, Figure 5 is a similar view, with the metallic gun component within the holder, and the cover closed, Figure 6 is a similar view, with the cover open, Figure 7 is a transverse section, taken on line 7—7 of Figure 4, Figure 8 is a similar view, taken on line 8—8 of Figure 5, Figure 9 is a similar view, taken on line 9—9 of Figure 6, Figure 10 is a side elevation, partly diagrammatic, of a vertically movable carriage and associated elements, Figure 11 is a side elevation and diagrammatic, of the machine, Figure 12 is a side elevation of a stationary cam, Figure 13 is a plan view of a second stationary cam, Figure 14 is a plan view of the completed product, Figure 15 is a side elevation of same, and Figure 16 is an end elevation of the same.

The numeral 20 designates a horizontal rotary turret, turning counter-clockwise in the direction of the arrows, Figure 1, and indexed by suitable means to produce a step-by-step movement. Mounted upon this turret are work holders 21, which are radially disposed and horizontal and turn upon their longitudinal axes. The holders 21 have gears 22, rigidly secured thereto, and these gears are not in mesh with each other, but engage a stationary annular rack 23, supported by any suitable means, so that the gears and their work holders are turned in unison about their horizontal longitudinal axes in the same direction. The turret 20 rotates about a vertical stationary shaft 23', and any suitable means may be employed to index the turret.

The numeral 24 designates a horizontal segmental table which is vertically movable. This table is arranged outwardly of and in concentric relation to the turret 20 and rack 23 and the table is segmental or longitudinally curved. The table 24 has three glass rod holders 25 rigidly mounted thereon having transversely tapered recesses 26, Figures 1 and 10, for receiving "Pyrex" glass rods 27. The numeral 28, Figures 1 and 10, designate gas burners, rigidly mounted upon the table 24 and supported at an elevation above the holders 25. These gas burners have tips 29, arranged to direct the flame against the opposite sides of the glass rods 27, at selected points P, Pa, Pb, and Pc, Figure 6, whereby the glass rod 27 is plasticised adjacent to these points, and the radial metal pins will become embedded in these plasticised portions, when the rod is moved upwardly.

The table 24 is rigidly mounted upon a vertical slide 30, Figure 10, operating within a stationary guide 31'. The slide 30 has a roller 31 mounted thereon engaged by a cam 32, mounted upon a horizontal shaft 33. A second cam 34 is mounted upon the shaft 33 and operates a lever 35, pivoted at 35' and connected with a valve 36, at 36', to open and close it. In Figure 10, the slide 30 is in the uppermost position and the lever 35 is also in the uppermost position and the valve 36 is closed to cut off the supply of gas to the burners. The burners are of course provided with the usual pilot lights so that the gas will be ignited when the gas is again turned on, upon the downward movement of the table 24 and lever 35.

As shown in Figure 1, the loading position is indicated at L, and A, B, and C are glass rod attaching positions. When the work holder is indexed to a position directly over the rod holder 25, the table 24 is raised and the plasticised glass rod is forced into engagement with the set of metal pins and the gas is cut off from the burner at about the time that the glass rod engages the pins.

The glass rods may be introduced into the holders 25 at the stations A, B and C. At each station, I have shown a horizontal guide trough 37, which is in alignment with the rod holder 25 when the table 24 is in the lowermost position. The glass rods 27 are arranged within each trough 37 in end-to-end relation and the leading glass rod is transferred from the trough 37 to the holder 25 by any suitable means, or manually.

The turret 20 is indexed about the vertical shaft 23' to bring each holder 21 to the loading and unloading position L and to the stations A, B and C, and there is a suitable dwell at these stations.

Each holder 21, Figure 3, is provided at its inner end with an annular flange 39, which is secured to the adjacent gear 22 by bolts 40. Each gear 22 has a sleeve 41 formed integral therewith and this sleeve is rotatably mounted within a bearing housing 42, Figures 1, 2 and 3, rigidly mounted upon the turret 20 by bolts 43. Roller bearings 44 are mounted between the bearing housing 42 and sleeve 41. The sleeve 41 is equipped with a collar 45, Figure 3, rigidly secured thereto, which prevents longitudinal movement of the sleeve 41. Each holder 21 includes sleeves 46 and 47, Figure 3, and the sleeve 46 is integral with the flange 39. Each holder further comprises a body portion which includes longitudinal intermediate bars or webs 48 which are integral with the sleeves 46 and 47. The bars 48 are circumferentially spaced for providing an opening or passage 50 between them and are further spaced to provide a cover opening 50' arranged opposite the opening 50. The inner faces of the bars 48 are cylindrically curved, as shown at 49'. The numeral 51 designates a cover including a cover-bar, having a cylindrically curved inner face 51'. This cover-bar has knuckles 52 rigidly secured thereto, and these knuckles 52 are pivoted to knuckles 53 by pins 54. The knuckles 53 are carried by the sleeves 46 and 47 and the cover-bar 51 is adapted to be moved to the closed position with respect to the bars 48, Figures 7 and 8, and to an open position with respect to such bars 48, Figure 9. The cover-bar 51 and the bars 48 are of substantially the same shape, producing an exteriorly generally triangular casing, having an inner cylindrical chamber to receive the work. When the cover bar 51 is closed, its edge 55 is spaced slightly from the adjacent edge 55' of one bar 48 and its opposite edge 56 is spaced slightly from the adjacent edge 56' of the other bar 48, Figures 7 and 8. This spacing provides passages or openings 56a, corresponding substantially to the diameter of the metal pins so that these pins are engaged and clamped into position by the cover-bar 51 when it is closed. The several openings 56a are formed in the side S of the holder 21.

Mounted within the cylindrical recess of the holder, is a pair of spacing plates or members 58, which are vertically arranged. These spacing plates are segmental and have straight vertical edges 59 to form a vertical passage 60 in alignment with the passage 50. The spacing plates 58 are radial and are arranged at right angles to the central longitudinal axis of the cylindrical recess of the holder. The spacing plates 58 are rigidly secured to radial slides or carirages 61 mounted within longitudinal slots 62, formed in the longitudinal bars 48. These longitudinal slots are radial and the inner ends of the slides 61 have flanges which prevent their outward displacement while heads 63 prevent their inward displacement. It is thus seen that the spacing plates 58 may be longitudinally adjusted within the recess of the holder, but cannot turn with relation thereto. The numeral 64 designates a second pair of spacing plates or members, which are identical with the spacing plates 58 except that the spacing plates 64 are inclined with respect to the longitudinal axis of the recess of the holder. The spacing plates 64 are rigidly mounted upon slides or carriages 66, slidable within the slots 62 and held therein against radial displacement. The slides 61 project to the right beyond the spacing plates 58 but not to the left beyond these spacing plates and the slides 66 project to the left beyond the spacing plates 64 but not beyond the right of the same. The spacing plates 64 are movable longitudinally with respect to the spacing plates 58.

Slidable within the end or sleeve 46, Figure 3, is a plunger 70, having a radial extension 72, carrying a locking pin 73 operating within an opening 74 and adapted to enter an opening 75 formed in the end of the cover-bar 51. It is thus seen that one end of the cover-bar 51 is locked to the sleeve 46 in the closed position, when the plunger 70 moves to the right, Figure 3. The numeral 79 designates a plunger slidably mounted in the sleeve 47 and movable into the cylindrical recess of the holder at its opposite end with respect to the plunger 70. The plunger 79 is biased inwardly by a spring 80, bearing against a collar 81, secured to the sleeve 47. The collar 81 slidably receives a shaft 82, upon which the spring 80 is mounted and this shaft has a reduced extension 83 at its forward end and the plunger 79 is rigidly mounted upon this reduced extension. The plunger 79 has a radial extension 84 operating within a groove 85 formed in the sleeve 47 and the radial extension 84 has a locking pin 85' rigidly secured thereto and slidable within an opening 86. The locking pin is arranged for movement into and out of an opening 87 formed in the end of the cover-bar 51. It is thus seen that when the cover-bar 51 is closed and the plunger 79 moves inwardly, the cover-bar will be locked in the closed position by one end by the pin 85'. The plunger 79 is biased inwardly by the spring 80, as stated, and a roller 88 is rotatably mounted upon the outer end of the shaft 82, but cannot move axially of the shaft.

The plunger 70 is carried by a horizontal shaft 89, which is slidable in the sleeve 41. The shaft 89 has a collar 90 clamped thereto, having an annular groove 91. This collar receives extensions 92, carried by the forked end 93 of the vertical arm of a bell crank lever 94, mounted upon a fixed pivot 95 and having a horizontal arm 96, carrying at its free end a roller 97. The horizontal arm 96 is moved downwardly by a spring 98, which serves to bias the plunger 70 inwardly or toward the right, Figure 3.

The roller 97 is arranged to engage a stationary cam track 99, Figures 1, 3, and 12, arranged beneath the turret 20 and near the L station. This cam track 99 has a top edge which is vertically inclined, providing a low point 99' and a high point 99a, and the top edge is gradually inclined vertically between these points. The numeral 100 designates a stationary cam track, disposed above the cam track 99 and arranged in generally concentric relation with the cam track 99 and turret 20. The ends of the cam track 100 are in radial alignment with the ends of the cam track 99. The cam track 100 has an outer side face 100' disposed to engage the wheels 88. The outer side face 100' is slightly eccentric with respect to the turret 20 and has an innermost point 100a and an outermost point 100b, and the outer face is horizontally inclined between these points. When the roller 97 engages the low point 99' of cam track 99 and travels toward the high point 99a, the pin 73 is being moved toward the outer end of the opening 75 and is moved entirely out of this opening when the roller 97 engages the high point 99a, which will occur when the holder also reaches the position of station L, and there is then a dwell of the turret. When the roller 88 engages the inner point 100a of the outer face of cam track 100 and travels to outer point 100b, the pin 85' is moving toward the outer end of the opening 87 and is completely moved out of opening 87 when the roller 88 engages outer point 100b, and this action also occurs when the holder is at the L station and the turret has a dwell. The cover-bar 51 is therefore unlatched and may be swung to the open position, Figures 6 and 9, so that the metallic sleeves of the gun component may be introduced into the holder, and the cover-bar 51 again closed, and this cover-bar will be again latched in the closed position when the roller 97 travels from point 99a and the wheel 88 travels from the point 100b.

Each gun component comprises a metallic sleeve 101, Figures 5, 14, 15 and 16. This metallic sleeve has an end 102 and a circumferential set of radial pins 103 secured thereto. The gun component further comprises an intermediate metallic sleeve 104, having a head 105 and an opposite inclined or diagonal edge 106. The heads 102 and 105 are at right angles to the longitudinal axis of the gun component and have openings 107 and 108 respectively, which are in alignment. The metallic sleeve 104 has a circumferential set of radial metallic pins, 109, rigidly secured thereto. The sleeve 104 also carries a metallic element 110, Figure 5, rigidly secured thereto which enters a wide slot 110' in the cover-bar 51. The gun component further comprises a metallic sleeve 111, having an inclined or diagonal end edge 112. The sleeve 111 has two sets of circumferential radial pins 113 rigidly secured thereto. Since there are three radial pins in each circumferential set, the pins in each set are spaced for a distance of 120 degrees. The pins in the several circumferential sets are correspondingly arranged, and these pins in the several sets form longitudinal sets of pins, and the pins in each longitudinal set are in alignment. The outer ends of the pins are preferably somewhat flattened to provide anchor heads.

When the cover-bar 51 is in the raised position, the plungers 70 and 79 are in the outer or retracted position. The metallic sleeve 101 is now inserted downwardly into the cylindrical recess of the holder, upon the right side of the spacing plates 58 and the metallic sleeve 104 is inserted in a similar manner into this recess between the spacing plates 58 and 64, which are longitudinally adjustable. The metallic sleeve 111 is now inserted within the recess upon the left side of the spacing plates 64, which are inclined to correspond with the inclination of the edges 106 and 112. The lowermost longitudinal set of radial pins 103, 109, and 113 extend through the lower vertical opening 50, while the two upper longitudinal sets of these pins are arranged near and above the upper edges of the bars 48, and when the cover-bar 51 is closed, the upper longitudinal sets of pins are clamped between the edges of the cover-bar 51 and the adjacent bars 48, and the several sleeves are circumferentially adjusted so that the pins in the longitudinal sets are in alignment. When the holder moves from the L position and the holder is receiving the metallic sleeves and the cover-bar is closed, the plungers 70 and 79 move inwardly and the several metallic sleeves are longitudinally adjusted and brought toward each other but kept slightly spaced by the spacing plates 58 and 64, which they now engage. The inclined edges 106 and 112 are now parallel. The cover-bar 51 is now locked in the closed position and the metallic sleeves are held in proper position when the holder is turned upon its longitudinal axis.

As each holder 21 moves adjacent the point 99a of the cam track 99 and the point 100b of the cam track 100, at station L, the cam track 99, Figure 3, raises the roller 97 and shifts the vertical arm of the bell crank lever 94 outwardly, while the cam track 100 engages the roller 88 and moves it radially outwardly. The plungers 70 and 79 are therefore moved to the outer position and the cover-bar 51 is unlocked and the operator may now swing the cover-bar to the open position. There is a dwell of the turret when the holding device is at the L station, and three holding devices are also at stations A, B, and C, so that the lowermost longitudinal set of pins are in alignment with the glass rods 27 within the holders 25 at the stations A, B, and C. When the turret is indexed for the next step, the holder 21 which was at the trailing ends of the cam tracks is now shifted to the longitudinal center of the cam tracks, and upon the next indexing step such holder is shifted to the leading end of the cam tracks, which are at the station L. It is thus seen that the cover bar is unlocked by the time the holder reaches station L, and this gives ample time for the operator to open the cover-bar 51, remove the completed product, and introduce metallic sleeves into the holder and again close the cover bar, before the means is operated to lock the cover-bar in the closed position, all of which occurring during the dwell of the holder at station L.

In the operation of the machine, each closed and loaded holder 21 is indexed from station L to stations A, B, and C in succession. The table 24 is in the lowermost position when the turret 20 has a dwell. When in the lowermost position the holders 25 are in alignment with the horizontal troughs and the glass rods are moved forwardly so that the leading glass rods are introduced into the holders 25. Upon the next index step of the turret, three holders are brought over and in alignment with the three glass rods within the holders 25, and the turret then has a dwell. At about the time that the holders 21 have been shifted to stations A, B, and C, the table 24 is in the lowermost position and the burners 28 are turned on to provide the flames, and these flames are projected against the opposite sides of each glass rod 27 which is heated at points P, Pa, Pb, and Pc, as explained, and after this heating is started the table is moved upwardly and the portions of the glass rod are plasticised by the time the rods near the pins of the metallic sleeves, and at about this time the supply of gas to the burners is cut off, and the upward movement of the table is continued so that the glass rod is forced upon the pins 103, 109 and 115, portions of the glass rod being now plasticised for this purpose. After this operation the table is now returned to the lowermost position which occurs during the last dwell of the turret. The turret 20 is indexed for the next step to bring the holder 21 at station A to station B, and there is a dwell of the turret when the holder is at station B, after the holder has turned upon its longitudinal axis for 120° and the next longitudinal set of pins is shifted to lowermost position. The glass rod 27 at station B is heated at selected points and the table 24 raised as explained to apply the glass rod to the lowermost set of pins and the table 24 again lowered while the holder 21 at station B is idling. The turret 20 is again indexed to bring the same holder 21 from station B to station C, where the operation is repeated and the holder turned upon its longitudinal axis to bring the next longitudinal set of pins to the lowermost position and the glass rod 27 at station C is secured to these pins, as described in connection with station A. At the end of the last dwell, the turret 20 is indexed for a plurality of steps in succession, and each holder 21 is brought adjacent to the trailing ends of the cam tracks 99 and 100, and move longitudinally of these cam tracks, and the cover-bar is latched and unlatched, as explained.

The metallic tubes 101, 104 and 111 are loaded downwardly into the cylindrical recess of the holder 21, and the segmental spacing plates 58 are arranged between the metallic tubes 101 and 104 and the spacing plates 64 are arranged between the metallic tubes 104 and 111. The lowermost set of longitudinal pins pass vertically through the opening 50, while the upper longitudinal set of pins may rest upon the upper edges of the bars 48, and when the cover-bar 51 is swung to the closed position, the pins in each longitudinal set are brought into accurate alignment, and when the plungers 70 and 79 move inwardly, they shift the metallic sleeves longitudinally so that they are brought into firm contact with the spacing plates and are properly longitudinally spaced, and held in the proper relative position. The cover-bar 51 for each holder is locked in closed position as soon as its holder is indexed from station L, and remains locked until such holder is again indexed to station L. When the loaded holder 21 reaches station L, the cover-bar 51 is unlatched and swung to the open position so that the completed product may be removed, and the lowermost attached glass rod 27 passes upwardly through the opening 50 and the passages between the pairs of spacing plates 58 and 64. The pairs of partition plates 58 and 64 are movable longitudinally with respect to the holder, which permits of the removal of the finished product. The distance between station C and station L is about one-third of a complete rotation of the turret 20, and this affords sufficient time for the glass rods 27 to properly cool and harden before the finished product is removed from the holder. This prevents distortion of the finished product.

The table 24 in the lowermost position is arranged at about the elevation of the turret 20, and is shifted from this position upwardly sufficiently to cause the pins to be embedded in the plasticised portions of the glass rod.

The cam 32 is timed in operation with respect to the turret so that the table 24 is in the lowermost position when the holders 21 are brought to stations A, B, and C upon the last indexed step of the turret and the turret is having a dwell. During this dwell the cam 32 moves the table 24 to the uppermost position and returns it to the lowermost position, before the next indexed step of the turret. This renders it possible to have the table 24 in the lowermost position when the turret is indexed for the next step to bring the holders over the glass rod holders 25. The cam 34 is also timed in operation so that the valve 36 will be opened to supply gas to the burners 28 when the table 24 is in the lowermost position and the valve 36 remains open until the table 24 approaches the end of its upstroke, at which time the valve 36 will be closed. The timing of movement of table 24 and the operation of the valve 36, may be somewhat varied, as found advantageous.

In view of the foregoing description, it is obvious that a plurality of metallic tubes having radial pins secured thereto are positioned within a holder, and the metallic tubes adjusted and held in place within the holder to provide longitudinal sets of radial pins, with the pins in each set in alignment, and the sets of pins equidistantly circumferentially spaced. Since three longitudinal sets of pins have been provided, the holder is indexed to three stations in succession. A glass rod is heated and plasticised at selected points and applied to one longitudinal set of pins at the first station and the pins become embedded in the plasticised portion. The holder is turned upon its longitudinal axis when being indexed to the next station for 120 degrees and this brings the next longitudinal set of pins into position to have a similar heated glass rod applied to this longitudinal set of pins. The holder is again turned upon its longitudinal axis for 120 degrees when moved to the succeeding station to bring the remaining longitudinal set of pins into position to have the heated glass rod anchored to such pins. The indexing of the holder continues until the loading station is reached, at which time the glass rods have suitably cooled and hardened and the finished product removed from the holder and the holder again loaded with the metallic tubes.

It is to be understood that the form of my invention herewith shown and described is to be taken as a preferred example of the same, and that various changes in the shape, size and arrangement of parts of the apparatus, and changes in the order of the steps of the method, may be resorted to without departing from the spirit of my invention or the scope of the subjoined claims.

Having thus described my invention, I claim:

1. Apparatus for producing a gun component of cathode ray tubes or the like, comprising a tubular holder including a body portion, said body portion having a main internal elongated recess, said body portion being provided in its side with elongated openings extending longitudinally of the holder, said elongated openings also extending generally radially of the internal recess and having their inner ends leading into the recess and their outer ends extending to the exterior of the tubular holder, spacing members arranged within the internal recess, and means to retain the spacing elements within the main recess and render them adjustable longitudinally of the recess.

2. Apparatus for producing a gun component of cathode ray tubes or the like, comprising a holder for removably receiving parts carrying laterally extending pins and having a side and having a main internal recess, said tubular holder being provided in its side with openings which are generally radial with respect to the internal recess and having their inner ends leading into such recess and their outer ends extending to the exterior of the tubular holder, said openings being circumferentially spaced with respect to the recess to receive the pins, spacing means mounted within the recess, and guide means mounted upon the tubular holder for adjustment longitudinally thereof and attached to the spacing means to retain the same within the recess.

3. Apparatus for producing a gun component of cathode ray tubes or the like, comprising a tubular holder including a body portion and cover, said body portion and cover forming an internal recess, said body portion having a wide opening, said cover when in the closed position forming with the body portion further openings, at least one further opening being narrow, the further and wide openings being circumferentially spaced with relation to the internal recess, the arrangement being such that parts carrying generally radial pins may be held within the main recess and the pins arranged in circumferentially spaced groups, the pins in one group passing through the wide opening and the pins in the other groups passing through the other openings and the pins in the narrow opening being held against circumferential displacement by the walls of such narrow opening, the wide opening being arranged substantially opposite the cover so that a glass rod anchored to the pins within the wide opening may be withdrawn through such wide opening.

4. Apparatus for producing a gun component of cathode ray tubes or the like, comprising a tubular holder including a body portion including a side having a cover opening and a cover for the cover opening, said cover opening having side walls, the body portion and cover forming an elongated internal recess, said body portion having a wide longitudinal opening substantially opposite the cover opening, the edges of the cover when in the closed position being spaced from the side walls of the cover opening for forming further longitudinal openings, at least one of said further openings being narrow, the wide and further longitudinal openings being circumferentially spaced with respect to the internal recess, spacing members arranged within the recess and having a passage between them which leads to the wide opening, and means to lock the cover in the closed position, the arrangement being such that parts carrying laterally extending pins may be held within the internal recess and said pins are received within the wide and further openings and extend through the same, the narrow opening holding the pins therein against circumferential displacement and the wide opening being adapted to receive a rod secured to the pins in the wide opening.

5. Apparatus for producing a gun component of cathode ray tubes or the like, comprising a tubular holder including a body portion including a side and having a cover opening in said side and a cover for the cover opening, said body portion and cover forming an internal elongated main recess, said body portion having a longitudinally extending wide opening arranged substantially opposite the cover opening, said cover when closed forming with the body portion longitudinal further openings, at least one further opening being narrow, the wide and further openings being circumferentially spaced with respect to the internal recess, spacing means within the internal recess and adjustable longitudinally thereof, the internal recess being adapted to receive parts carrying generally radial pins and the spacing means arranged between said parts and the pins extending through the wide and further openings, the narrow opening holding the pins therein against circumferential displacement and the wide opening being adapted to receive a rod secured to the pins within the wide opening, means to hold the cover in the closed position, and means to press the parts together longitudinally of the main recess.

6. Apparatus for producing a gun component of cathode ray tubes or the like, comprising a tubular holder including a body portion having a side cover opening, a cover for the opening, the cover and body portion forming an elongated main internal recess, said body portion having a longitudinal wide opening leading into the recess, the cover when closed forming with the body portion further longitudinal openings, at least one of the further openings being narrow, the further and wide openings being circumferentially spaced with respect to the main recess and the wide opening being arranged substantially opposite the side cover opening, the main recess receiving parts having generally radial pins which extend through the wide and further openings, the narrow opening holding the pins therein against circumferential displacement and the wide opening being adapted to receive a rod secured to the pins in the wide opening, plungers movable longitudinally within the ends of the main recess, yielding means to move the plungers inwardly, and means operated by the movement of the plungers to lock the cover in the closed position.

7. Apparatus for producing a gun component of cathode ray tubes or the like, comprising a tubular holder including a body portion having a cover opening in its side, a cover for the cover opening hinged to the body portion to be shifted to opened and closed positions, the cover when in the closed position forming with the body portion an internal recess and said cover having side walls spaced from the side walls of the cover opening to form first named longitudinal openings, the internal recess receiving parts having laterally extending pins the body portion being provided with a wide longitudinal opening arranged substantially opposite the cover opening, the pins being received within the first named openings and the wide opening, the wide opening being adapted to receive a rod secured to the pins in the wide opening, means for holding the cover closed, and yielding means for exerting pressure in a direction longitudinally of the internal recess upon the parts held within the recess.

8. Apparatus for producing a gun component of cathode ray tubes or the like, comprising a turret to be indexed to different positions, a tubular holder mounted upon the turret to be turned upon its axis with relation to the turret, the tubular holder having an internal recess and including a body portion and side cover, means to turn the tubular holder upon its axis, automatic means for locking and unlocking the cover with and from the body portion, said tubular holder having generally radial opening means for receiving generally radial pins carried by parts held within the internal recess, means to move the parts together within the internal recess, and means arranged exteriorly of the tubular holder to heat a glass rod and move the same into contact with the pins extending through the opening when the holder is brought to a selected position.

9. Apparatus for producing a gun component for cathode ray tubes or the like, comprising a turret to be indexed to different positions, tubular holders mounted upon the turret to be turned upon their axes with relation to the turret, each tubular holder having an internal recess and including a body portion and side cover, each tubular holder having generally radial opening means for receiving generally radial pins carried by parts held within the internal recess, means to turn each tubular holder when it is indexed from one station to the next station, automatic means for locking and unlocking the cover with and from the body portion of each tubular holder, spacing means arranged within each tubular holder, means to move the parts together within the internal recess, a plurality of carriages mounted at successive stations near the turret and movable toward and from the tubular holders for holding glass rods, means to heat the glass rods upon the carriages, and means to move the carriages.

10. Apparatus for producing a gun component of cathode ray tubes or the like, comprising a support, a bearing mounted upon the support, a sleeve rotatably mounted within the bearing, means to turn the sleeve, a tubular holder including a body portion having a side cover opening, said body portion including end sleeves, a cover for the cover opening, releasable means to lock the cover in the closed position, the cover and body portion forming an internal recess, plungers slidably mounted within the end sleeves and connected with the locking means to actuate the same, yielding means to move the plungers inwardly, and separate means to move the plungers outwardly.

11. Apparatus for producing a gun component of cathode tubes or the like including parts and laterally extending correspondingly circumferentially spaced pins carried by each part, a holding device for the gun component, said holding device including means for arranging the pins in longitudinal sets, the pins extending to the exterior of the holding device, a turret to be indexed, means to mount the holding device upon the turret, means to turn the holding device with relation to the turret, glass rod holding devices arranged exteriorly of and in cooperative relation to the gun component holding device when shifted to the indexed positions, means to heat the glass rods while held by the glass rod holding devices for plasticising the glass rods, and means to operate each glass rod holding device to bring a glass rod into engagement with each longitudinal set of pins to embed the pins in the plasticised glass rod when each longitudinal set of pins is turned to a selected position.

12. Apparatus for producing a gun component of cathode tubes or the like including parts and laterally extending correspondingly circumferentially spaced pins carried by each part, a turret, holding devices for the gun components, each holding device holding said parts and including means for arranging the pins in longitudinal sets, the pins extending to the exterior of the holding device, means to mount the holding devices upon the turret, means to turn each holding device with relation to the turret, glass rod holding devices arranged exteriorly of and in cooperative relation to the turret and the gun component holding devices when shifted to the indexed positions, means to heat the glass rods while held by the glass rod holding devices for plasticising the glass rods, and means to operate each glass rod holding device to bring a glass rod into engagement with each longitudinal set of pins at the indexed position when each longitudinal set of pins is turned to a selected position to embed the pins in the plasticised glass rod.

13. Apparatus for producing a gun component of cathode tubes or the like including parts and laterally extending correspondingly circumferentially spaced pins carried by each part, a rotary turret to be indexed, spaced holding devices for the gun components which are circumferentially spaced with respect to the turret, each holding device holding said parts and including means for arranging the pins in longitudinal sets, the pins extending to the exterior of the holding device, means to mount the holding devices upon the turret, means to turn the holding devices with relation to the turret, glass rod holding devices arranged exteriorly of the turret and circumferentially spaced with relation to the turret and arranged in cooperative relation to the gun component holding devices when such gun component holding devices are shifted to the indexed positions, means to heat the glass rods while held by the glass rod holding devices to plasticise the glass rods, means to operate each glass rod holding device to bring a glass rod into engagement with each set of pins at the indexed position when each longitudinal set of pins is turned to a selected position to embed the pins in the plasticised glass rod.

14. Apparatus for producing a gun component of cathode tubes or the like including parts and laterally extending circumferentially spaced pins carried by each part, a substantially horizontal rotary turret to be indexed, substantially horizontal circumferentially spaced tubular holding devices for the gun components, each tubular holding device including a body portion having a cover opening in its side and a cover for the cover opening, said body portion having a wide slot arranged substantially opposite the cover opening, said body portion having further slots, at least one of the further slots being narrow, the wide and further slots being circumferentially spaced, said body portion receiving said parts and the laterally extending pins extending through said slots to the exterior of the body portion, the narrow slot holding the pins therein against circumferential movement, means to mount the holding devices upon the turret, means to turn the holding devices with relation to the turret, glass rod holding devices arranged exteriorly of the turret and disposed beneath the gun component holding devices and circumferentially spaced and holding the glass rods substantially radial, means to heat the glass rods while held by the glass rod holding devices to plasticize the glass rods, means to move each glass rod holding device upwardly to bring the glass rod into engagement with a set of pins at the indexed position when each longitudinal set of pins is turned to the lowered position to embed the pins in the plasticized glass rod, the arrangement being such that the completed gun component may be removed from the gun component holding device through the cover opening, the glass rod next to the wide slot passing upwardly through the wide slot.

15. Apparatus for producing a gun component of cathode tubes or the like including parts and laterally extending correspondingly circumferentially spaced pins carried by each part, a substantially horizontal rotary turret to be indexed, spaced holding devices for the gun components which are arranged substantially radially with respect to the turning axis of the turret, each holding device holding said parts and including means for holding the pins in longitudinal sets the pins extending to the exterior of the holding device, means to mount the holding devices upon the turret, means to turn the holding devices with relation to the turret, glass rod holding devices disposed beneath the gun component holding devices and including parts arranged substantially radially of the turning axis of the turret, means to heat the glass rods while held by the glass rod holding devices to plasticize the glass rods, and means to operate each glass rod holding device to bring a glass rod into engagement with one set of pins at the indexed position when each longitudinal set of pins is turned to a selected position to embed the pins in the plasticized glass rod.

16. Apparatus for producing a gun component of cathode tubes or the like including parts and laterally extending circumferentially spaced pins carried by each part, a substantially horizontal rotary turret to be indexed, substantially horizontal substantially radial circumferentially spaced tubular holding devices for the gun components, each tubular holding device including a body portion having an opening in its side for the passage of said parts and a wide slot arranged substantially opposite the opening, means for retaining said parts within the body portion, said body portion having further slots, the wide and further slots being circumferentially spaced, at least one of the further slots being narrow, the tubular body portion receiving said parts and the laterally extending pins extending through said slots to the exterior of the holding device, means to mount the holding devices upon the turret, means to turn the holding devices with relation to the turret, means for holding said parts in each body portion in spaced relation, substantially radial glass rod holding devices arranged exteriorly of the turret and disposed beneath the holding devices and circumferentially spaced, means to heat the glass rods while held by the glass rod holding devices to plasticise the glass rods, means to move each glass rod holding device upwardly to bring the glass rod into engagement with each set of pins at the indexed position when each longitudinal set of pins is turned to the lowered position to embed the pins in the plasticised glass rod, the arrangement being such that the completed gun component may be removed from the body portion through the opening, the glass rod next to the wide slot passing upwardly through the wide slot.

17. Apparatus for producing a gun component of cathode tubes or the like including spaced parts arranged in axial relation and laterally extending pins carried by the parts and extending beyond the same, said apparatus comprising a holding device for removably receiving said parts therein and having opening means to receive the pins which extend to the exterior of the holding device, said holding device including relatively movable members to provide access to the interior of the holding device, spacing means to bear against the adjacent ends of said parts to define the distance between such adjacent ends, means arranged exteriorly of and in cooperative relation to the holding device for holding a plasticisable rod, means to heat the plasticisable rod while held by the rod holding means for plasticising the rod, and means to effect a relative movement between the rod holding means and said holding device to embed the pins in the plasticised rod.

18. Apparatus for producing a gun component of cathode tubes or the like including spaced parts and laterally extending pins carried by the parts and extending beyond the same, said apparatus comprising a holding device for removably receiving the parts therein and having opening means to receive the pins which extend to the exterior of the holding device, means serving to define the distance between the adjacent ends of said parts, means arranged exteriorly of and in cooperative relation to the holding device for holding a plasticisable rod, means to heat the plasticisable rod while held by the rod holding means for plasticising the rod, and means for effecting a relative movement between the rod holding means and the holding device to embed the pins in the plasticised rod.

19. Apparatus for producing a gun component of cathode tubes or the like including spaced parts, and laterally extending pins carried by the parts and extending beyond the same, said apparatus comprising a holding device for removably receiving said parts and holding them in axial relation with each other and permitting relative axial movement between the parts while held within the holding device, said holding device having elongated opening means extending longitudinally thereof to receive the pins which extend to the exterior of the holding device, said opening means holding the pins in a longitudinal group, spacing means to define the distance between the adjacent ends of said parts, means arranged exteriorly of and in cooperative relation to the holding device for holding a plasticisable rod, means to heat the plasticisable rod for plasticising the same, and means to effect a relative movement between the rod holding means and the holder to embed the pins in the plasticised rod.

20. Apparatus for producing a gun component of cathode tubes or the like including spaced parts and laterally extending pins carried by the parts and extending beyond the same, said apparatus comprising a holding device for removably receiving the parts and holding them in axial relation and permitting relative axial movement between the parts while held within the holding device, said holding device having opening means to receive the pins which extend to the exterior of the holding device, means to move said parts axially with relation to each other while held within the holding device, spacing means having at least a portion thereof engaging the adjacent ends of said parts to define the distance between such adjacent ends, means arranged exteriorly of and in cooperative relation to the holding device for holding a plasticisable rod, means to heat the plasticisable rod to plasticise the same, and means to effect a relative movement between the rod holding means and the holding device to embed the pins in the plasticised rod.

21. Apparatus for producing a gun component of cathode tubes or the like including longitudinally spaced parts, each part carrying laterally extending pins which are circumferentially spaced and projecting beyond the same, said apparatus comprising a holding device for removably receiving the parts and holding them in axial relation, said holding device having opening means to receive the pins which extend to the exterior of the holding device and arrange the pins of said parts in longitudinal groups, spacing means to define the distance between adjacent ends of said parts, means arranged exteriorly of and in cooperative relation to the holding device for holding plasticisable rods corresponding in number to the longitudinal groups of pins, means to heat the plasticisable rods to plasticise the same, and means to effect a relative movement between the means which holds the rods and the holding device to embed the pins in the plasticised rods.

22. Apparatus for producing a gun component of cathode tubes or the like including end parts and an intermediate part arranged in a longitudinal group, each part having a laterally extending pin extending outwardly beyond the same, a holding device for removably receiving therein the end parts and intermediate part and retaining them in a longitudinal group and substantially coaxial with each other, said holding device having opening means to receive the pins which extend to the exterior of the holding device, spacing means engaging the adjacent ends of the end parts to define the distance between such adjacent ends, means arranged exteriorly of and in cooperative relation to the tubular holding device for holding a plasticisable rod, means to heat the plasticisable rod to plasticise the same, and means to effect a relative movement between the rod holding means and the holding device to embed the pins in the plasticised rods.

23. A jig for facilitating the union of cylindrical, axially aligned work pieces each having confronting bias-cut ends and radially outwardly projecting studs comprising a lower part and an upper part, each part having a substantially semi-cylindrical cavity therein, at least one axially extending lateral margin of a cavity having a longitudinal recess in communication with the interior of the cavity and the exterior face of the part, the floor of the recess being parallel to the imaginary diametral plane defining the cavity, means for detachably securing said parts in operative relation, means for positioning the work pieces in predetermined relation in the cavities, the studs of the work pieces being circumferentially located by engagement with the recesses upon securement of said parts in operative relation about the work pieces.

24. A jig as recited in claim 23 in which the positioning means includes a pair of spring-pressed plungers guided by and slidable in one of said parts, said plungers being adapted to apply holding force longitudinally of the work pieces.

References Cited in the file of this patent

UNITED STATES PATENTS

| 1,037,196 | Bing | Sept. 3, 1912 |
| 1,550,161 | Hamm et al. | Aug. 18, 1925 |
| 1,660,329 | Fleming | Feb. 28, 1928 |
| 1,866,634 | Eisler | July 12, 1932 |
| 1,877,431 | Swanson | Sept. 13, 1932 |
| 1,935,988 | Parker | Nov. 21, 1933 |
| 1,975,422 | Hellenbroich | Oct. 2, 1934 |
| 2,174,853 | Bowie | Oct. 3, 1939 |
| 2,447,569 | Eisler | Aug. 24, 1948 |
| 2,486,101 | Beggs | Oct. 25, 1949 |
| 2,488,126 | Kahle | Nov. 15, 1949 |
| 2,511,914 | Haas | June 20, 1950 |

FOREIGN PATENTS

| 441,891 | Great Britain | Jan. 29, 1936 |